Dec. 30, 1958 R. D. GERWE ET AL 2,866,709
METHOD OF TREATING PEACHES
Filed June 22, 1953
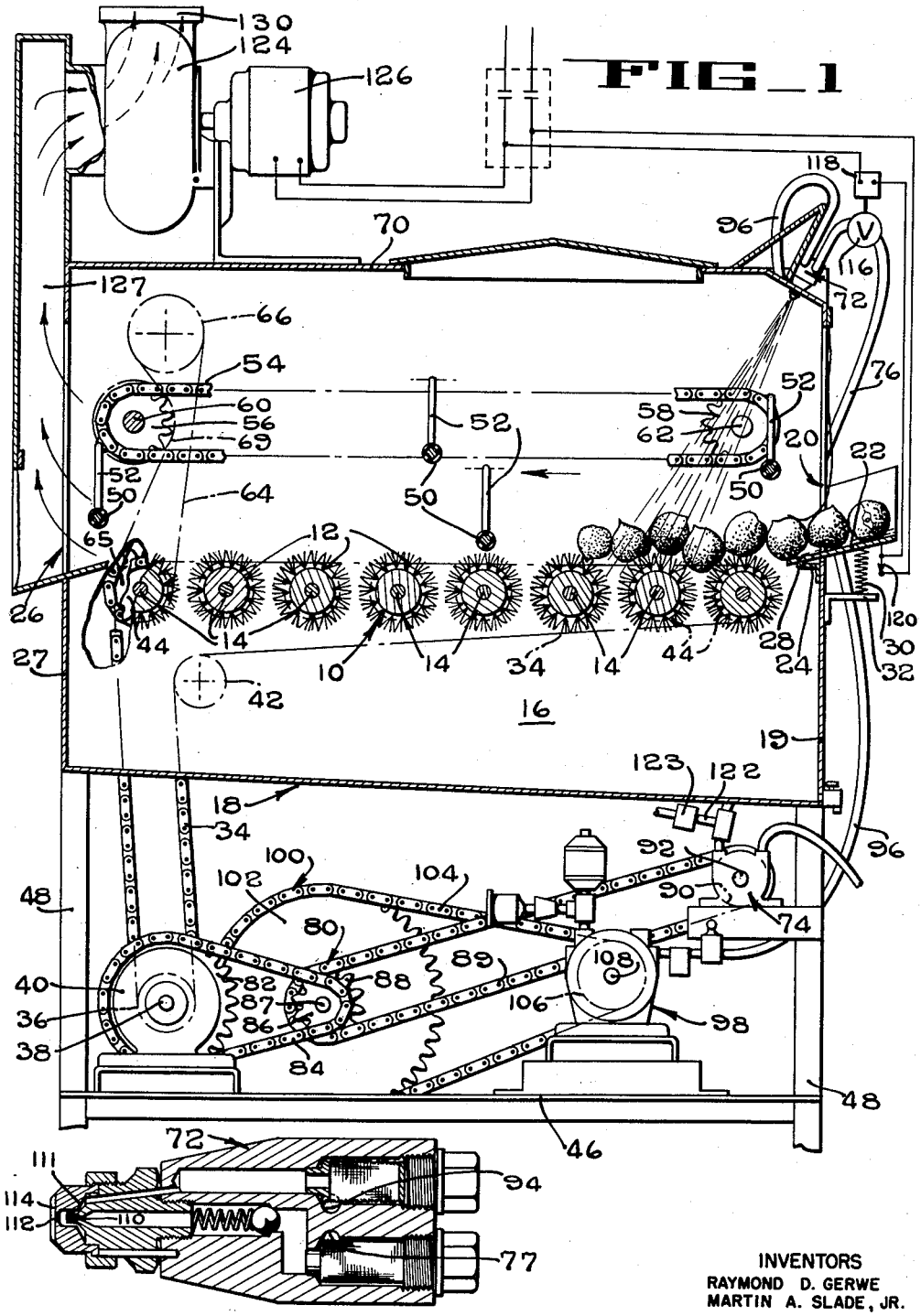
FIG_1
FIG_2
INVENTORS
RAYMOND D. GERWE
MARTIN A. SLADE, JR.
BY Hans G. Hoffmeister
ATTORNEY

United States Patent Office 2,866,709
Patented Dec. 30, 1958

2,866,709

METHOD OF TREATING PEACHES

Raymond D. Gerwe and Martin A. Slade, Jr., Lakeland, Fla., assignors to Food Machinery and Chemical Corporation, San Jose, Calif., a corporation of Delaware Application June 22, 1953, Serial No. 363,308

6 Claims. (Cl. 99—168)

The present invention relates to the treatment of fruit to preserve its freshness. More particularly the present invention relates to methods, media, and apparatus for providing fruit with a coating of wax to reduce loss of moisture, protect it from direct exposure to the atmosphere, and in this manner slow down its aging process.

Peaches are amongst the most perishable of all fruit, and it has long been recognized as highly desirable to provide them with a protective coating of wax so as to preserve their freshness until such time when they are sold on the market. Unfortunately, however, peaches are also a most delicate type of fruit, and it has therefore been a problem to provide them with a wax coating without injuring them in the process. Thus, it was found unsatisfactory to treat peaches with wax dissolved in the customary organic solvents because these solvents attacked their tender skins. Similarly, it proved unsatisfactory to apply wax in molten form to peaches because a wax that would form a durable coating must be of the high melting type, and the heat required to melt and maintain such types of wax in molten form to enable their application, proved injurious to the fruit. Another difficulty encountered in providing peaches with wax coatings is the fact that the surface of peaches is fuzzy so that it is difficult for any coating material to reach, and adhere to, the basic surface of the fruit. While it has been the practice to remove the fuzz from the peaches by a method known as "de-fuzzing" which is accomplished by bringing the peaches into contact with rotating brushes, these de-fuzzing processes fail to remove all the fuzz and leave at least a multitude of short stubbles on the peach skin. These stubbles and any residual fuzz make it difficult for the coating material to adhere to the peaches and to form a thin, continuous and all-enclosing film around the fruit.

It is an object of the present invention to provide a coating preparation that lends itself readily for application to such delicate fruit as peaches, without harmful effects thereon.

Another object is to provide a method of applying a coating preparation to peaches in such a manner that a thin, durable and continuous film is formed around the fruit irrespective of fuzz and/or stubbles on its surface.

Another object is to provide peaches with a thin, durable, and water repellent protective coating that will not smother the fruit, yet make it possible to expose it safely to cold water baths, such as may be employed to lower its temperature.

Another object is to provide a simple and effective apparatus for treating peaches in such a manner that a thin protective coating of a wax or wax-like substance is formed around the fruit.

We have found that preparations comprising a wax or wax-like substance dissolved in a refined vegetable oil may readily be applied to peaches and result in thin, continuous and durable wax films around the fruit without harmful effects upon the tender skin thereof. For this purpose any one of the following waxes, or wax-like substances, or any desired combination of two or more of said substances may be employed:

Paraffin wax
Spermaceti
Partially hydrogenated soyabean oil—Modifat 134–A
Fractionally distilled fatty acids of cocoanut oil—Alifat 21–A
Myristic acid—Neo-fat 13
Sorbitan monostearate—Span 60
Polyoxyethylene sorbitan monostearate—Tween 61
Glyceryl monomyristate
Cetyl alcohol
Coco-butter These waxes or wax-like substances may be dissolved in any one of the following vegetable oils: Cottonseed oil, corn oil, olive oil, peanut oil, soya bean oil, sesame oil, and the like.

As a practical example, a preparation made from refined cottonseed oil and containing from .25 to 5.0% by weight of refined paraffin wax proved highly satisfactory. It proved beneficial to add from .1% to .2% by weight of an anti-oxidant such as nordihydroguaiaretic acid commonly known as N. D. G. A., Alcolec S, a derivative of lecithin, or Stabolec B, a compound of lecithin, citric acid, and propyl gallate, to the treating solutions. The usefulness of the preparations as treating agents for the preservation of peaches may be increased by the addition of small quantities of a suitable oil-soluble fungicide, such as orthophenylphenol, salicyl anilide, or the organic amine salt of the latter.

To cause the formation of a thin, continuous and durable film around the fruit, the preparation of the invention should be applied in highly atomized form and at a high velocity. This may be accomplished by means of pneumatic spray nozzles. When applied in this manner, it will form an extremely thin yet durable protective film around the fruit in spite of fuzz or stubbles that may be present on its surface. The results are particularly satisfactory when the fruit is brushed with horsehair brushes as the atomized spray of the preparation is applied thereto.

In the accompanying drawings:

Fig. 1 shows a partially schematic longitudinal cross-section through an apparatus for providing peaches with a wax coating in accordance with the invention, and Fig. 2 is an axial section through one of the pneumatic spray nozzles employed in the apparatus illustrated in Fig. 1.

In Fig. 1 the reference numeral 10 designates a sequence of eight horizontally disposed cylindrical horsehair brushes 12 that are adjacently positioned in the manner of a roller conveyor and which are mounted upon an equal number of parallel spindles 14 that extend transversely across and are rotatably mounted in the side walls 16 of an enclosure 18. One end wall 19 of said enclosure is provided with a feed opening 20 to receive an inclined feed chute 22 through which the fruit is delivered onto the horsehair brushes 12. The inner end of the chute 22 is hinged to a shelf 24 that is secured to the inner face of the end wall 19 and the outer end of the chute is yieldably maintained in a raised position by a suitable spring means 30 that bears against another shelf 32 which is secured to the outer face of the end wall 19.

To advance fruit delivered onto the brushes 12 from the feed end of the enclosure to a discharge opening 26 provided in the opposite end wall 27 thereof, the brushes 12 are rotated in counterclockwise direction as viewed in Fig. 1. This may be accomplished by means of an endless sprocket chain 34 that is driven from a sprocket 36 which is mounted upon the drive shaft 38 of an electric motor 40 and which is trained over an idler sprocket 42 and sprockets 44 that are mounted upon the spindles 14 adjacent the outer surface of one of the side walls 16 of the enclosure. The motor 40 may be bolted to a base panel 46 disposed below the enclosure 18 and supported from the legs 48 thereof. In order that the fruit delivered onto the rotary brushes 12 may not become lodged in the interstices between adjacent brushes, rubber-sheathed dragging bars 50 are drawn over the path established by the upper segments of the rotary brushes during operation of the machine. At their opposite ends said bars 50 are pivotally secured to arms 52 that depend from a pair of endless sprocket chains 54 which are trained about pairs of sprockets 56 and 58, respectively. Said sprocket pairs are firmly mounted upon a transverse shaft 60 and stub shafts 62, respectively, located near the discharge and feed ends of the enclosure 18 and rotatably supported in the side walls 16 thereof. The shaft 60 at the discharge end of the enclosure is driven from the hereinbefore mentioned motor 40 by means of an endless sprocket chain 64 that is trained around a sprocket 65 mounted upon the spindle 14 of the last of the rotary brushes 12 and an idler sprocket 66 rotatably supported from the side wall 16 above the level of shaft 60. Said sprocket chain 64 engages with its outer periphery a sprocket 69 that is firmly secured to the shaft 60.

Mounted in the ceiling 70 of the enclosure 18 near the feed end thereof are several pneumatic spray nozzles 72, only one being visible in Fig. 1. Said nozzles are arranged to direct their spray cones against the fruit as it moves from the feed chute 22 onto the conveyor path 10 formed by the horsehair brushes 12. A pneumatic spray nozzle of the type adapted to produce a spray of sufficient velocity and atomization to form a thin yet continuous and durable wax film around the fruit is illustrated by way of example in Fig. 2. A pump 74 delivers the treating preparation from a supply tank (not shown) through a conduit 76 to an inlet port 77 of said nozzle. During operation of the apparatus the pump is continuously driven from the hereinbefore mentioned electric motor 40 by means of a transmission 80 comprising a sprocket 82, an endless sprocket chain 84, a sprocket 86 mounted upon a shaft 87, another sprocket 88 mounted upon said shaft 87, an endless sprocket chain 89, and a sprocket 90 that is firmly mounted upon the drive shaft 92 of the pump. Compressed air is delivered to another entrance port 94 of the nozzle 72 through a conduit 96 from a compressor 98 that is mounted upon the same base panel 46 as the motor 40. Said compressor 98 is driven from the motor 40 through a transmission 100 comprising the hereinbefore mentioned sprocket 82, the aforementioned sprocket chain 84, the hereinbefore mentioned sprocket 86 mounted upon shaft 87, a large diameter sprocket 102 mounted upon said shaft 87, an endless sprocket chain 104, and a sprocket 106 mounted upon the drive shaft 108 of the compressor 98.

The stream of treating liquid supplied to the nozzle 72 by the action of pump 74 is forced through a narrow centrally located aperture 110 to form a primary spray cone, and the air introduced into said nozzle under the action of compressor 98 impinges along a conically converging surface 111 upon said primary spray cone. The resultant mixture of treating liquid and air passes then through another narrow aperture 112 and a slot 114 into the outside atmosphere forming a spray that flings the treating liquid in extremely fine dispersion and at high velocity against the fruit which passes underneath the nozzles 72 and which is continuously turned and twisted by the rotating horsehair brushes so as to present all its sides to the film-forming sprays. At the same time contact of the rotating horsehair brushes with the sprayed fruit rubs the spray onto the basic fruit surface and spreads it evenly over the fruit.

In an exemplary embodiment of the invention, the pump 74 was arranged to deliver the treating liquid to the nozzles 72 at a pressure of about 10 lbs. per square inch and the compressor was arranged to deliver air to the nozzles at a pressure of about 12 lbs. per square inch. The horsehair brushes had an overall diameter of 4½ inches and a core diameter of 2½ inches, and they were mounted with their center axes spaced 5 inches apart and driven at a rotational speed of about 175 R. P. M. For optimum results, we found that the speed of rotation of brushes of the defined size should not be less than 100 R. P. M., otherwise they will not adequately spread the coating preparation around the fruit nor rub it sufficiently into the surface thereof. On the other hand, speeds in excess of 200 R. P. M. are liable to injure the skin of the fruit.

To prevent waste of the treating preparation, the supply conduit 76 may comprise a normally closed valve 116 which is controlled by a solenoid 118, and the power circuit of the solenoid may contain a normally open switch 120 that is disposed below and is arranged to be closed by the feed chute 22, whenever said chute is lowered on its hinge 28 against the urgency of the spring means 30 under the weight of fruit delivered thereonto. Closure of switch 120 energizes the solenoid 118 which opens the valve 116 so that treating preparation is delivered to the nozzle and is hurled against the fruit that closed the switch 120, as it reaches the rotary brushes 12. As soon as the supply of fruit to the chute 22 is interrupted, however, the spring means 30 restores the chute to its normally raised position permitting the switch 120 to return to open condition. As a result thereof, the solenoid 118 is de-energized and the valve 116 blocks the conduit 76 causing the liquid delivered into said conduit under the force of pump 74 to return to the supply tank through a shunt line 122 controlled by a relief valve 123.

In order to avoid that unused portions of the atomized spray within the enclosure 18 may reach, and contaminate, the atmosphere around the spraying apparatus, a fan 124 driven by an electric motor 126 may be mounted upon the roof 70 of the enclosure near the discharge end thereof to exhaust the atmosphere within said enclosure through a suitable funnel 127 that extends partially over the discharge opening 26. Said fan may be arranged to deliver the exhausted atmosphere into a chimney 130.

In carrying out the processes of the invention in practice, peaches are first de-fuzzed in the customary manner by the use of rotary brushes. They are then delivered into the described apparatus, with the rotational speed of the horsehair brushes 12 adjusted, within the previously stated limits, to pass the fruit through the enclosure 18 within a period of from 10 to 20 seconds. When the fruit leaves the apparatus through the discharge opening 26, it is provided with a continuous, protective film which is extremely thin as is demonstrated by the fact that the amount of treating liquid applied to the individual peaches ranges from only .1 to .5 cubic centimeter. The films thus formed are completely hydrophobic so that the fruit may, prior to shipping, be subjected to a cooling water bath wherein the temperature of the peaches is reduced to approximately 45° F. without harmful effect, and any condensation upon the fruit which may form when it is transferred from a colder to a warmer atmosphere will in no way impair the fruit. As an added effect, the film of the invention reduces loss of moisture due to evaporation and loss of natural sugars such as result from high rates of respiration of the harvested fruit. In consequence, peaches treated in accordance with the invention remain firm and retain their fresh appearance long after untreated peaches have begun to lose weight and shrivel, and assume generally an aged appearance. In fact, the treatment of the invention intensifies the natural red, pink and yellow colors of the fruit and, therefore, increases its eye appeal over that of untreated fruit. Moreover, the films provided around peaches in accordance with the invention form a protective coating over punctures, scratches, and other abrasions of their delicate skin and in this manner aid in retarding decay that usually starts at rind injuries of this type.

While we have described our invention with the aid of a particular embodiment thereof, it will be understood that we do not wish to be limited to the constructional details shown or the exemplary ingredients and percentages stated, which may be departed from without departing from the scope and spirit of the invention. It should also be understood that wherever the appended claims call for a wax, this term is meant to include not only a true wax but also wax-like substances of the type mentioned in the hereinbefore given list.

Having described our invention, what we claim is:

1. The method of treating fresh peaches by providing them with a film for preserving their freshness, which comprises subjecting the fruit to a highly atomized spray of a wax dissolved in a refined vegetable oil, the concentration of said wax in said vegetable oil being from .25% to 5% by weight.

2. The method of treating fresh peaches by providing them with a film for preserving their freshness, which comprises subjecting the fruit to a highly atomized spray of a wax dissolved in a refined vegetable oil while brushing its surface with a horsehair brush, the concentration of said wax in said vegetable oil being from .25% to 5% by weight.

3. The method of treating fresh peaches for preserving their freshness, which comprises subjecting the fruit to an atomized spray of wax dissolved in a refined vegetable oil while brushing it with a rotating horsehair brush to form a thin coating of the wax around the fruit, the concentration of said wax in said vegetable oil being from .25% to 5% by weight, and thereafter subjecting the fruit to refrigerated water.

4. The method of treating fresh peaches for preserving their freshness, which comprises de-fuzzing the fruit and thereafter subjecting the fruit to an atomized spray of wax dissolved in a refined vegetable oil while brushing it with a rotating horsehair brush to form a thin coating of wax around the fruit, the concentration of said wax in said vegetable oil being from .25% to 5% by weight.

5. The method of treating fresh peaches for preserving their freshness which comprises de-fuzzing the fruit, thereafter subjecting the fruit to an atomized spray of wax dissolved in a refined vegetable oil while brushing it with a rotating horsehair brush to form a thin coating of said wax around the fruit, the concentration of said wax in said vegetable oil being from .25% to 5% by weight, and thereafter subjecting the fruit to refrigerated water until its temperature has dropped to about 45° F.

6. A method of treating a peach having particles of fuzz on its outer surface, which comprises directing an atomized liquid spray of wax dissolved in a refined vegetable oil toward the peach at a high velocity to cause said spray to pass between the particles of fuzz on the peach and to impinge on and adhere to the surface of the peach as a thin coating, said liquid spray comprising a refined vegetable oil containing from .25% to 5.0% by weight of wax.

References Cited in the file of this patent
UNITED STATES PATENTS

| | | |
|---|---|---|
| 1,651,350 | Jamieson | Nov. 29, 1927 |
| 1,700,908 | Ricketts | Feb. 5, 1929 |
| 1,985,843 | Skinner | Dec. 25, 1934 |
| 1,985,846 | Trowbridge | Dec. 25, 1934 |
| 2,007,177 | Brogden | July 9, 1935 |
| 2,290,452 | Sharma | July 21, 1942 |
| 2,364,946 | Burwick et al. | Dec. 12, 1944 |
| 2,469,914 | Bridgeman | May 10, 1949 |
| 2,489,743 | Brogden | Nov. 29, 1949 |
| 2,567,085 | Stoloff | Sept. 4, 1951 |
| 2,611,708 | Owens et al. | Sept. 23, 1952 |
| 2,744,834 | Robinson | May 8, 1956 |